Dec. 28, 1965  H. E. ROBINSON  3,225,752
BY-PASS VALVE FOR ENGINES
Filed Nov. 8, 1963
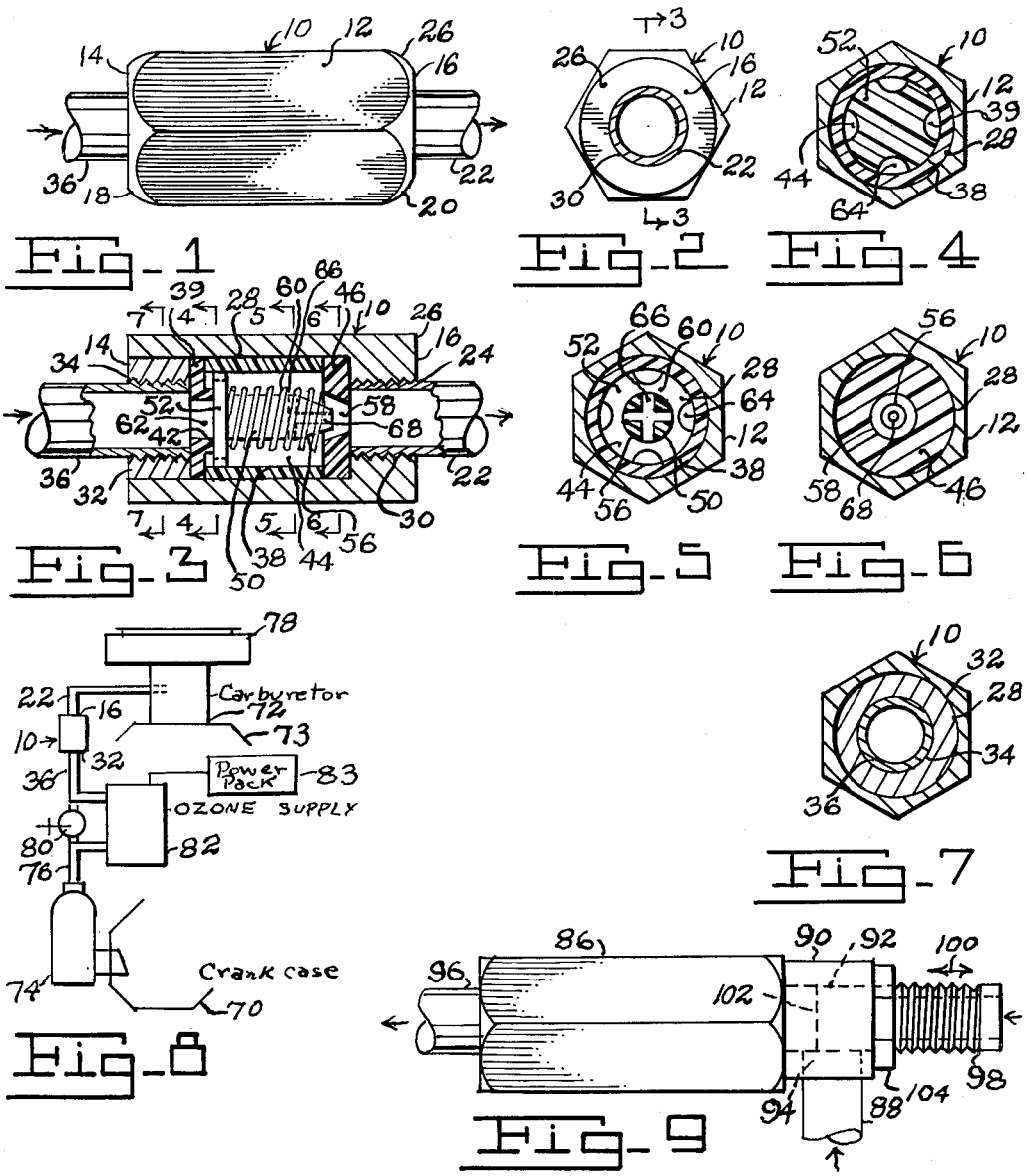
INVENTOR.
HAROLD E. ROBINSON
BY

United States Patent Office 3,225,752
Patented Dec. 28, 1965

3,225,752
BY-PASS VALVE FOR ENGINES
Harold E. Robinson, Great Neck, N.Y., assignor to Dyna-Nuclear Corporation, Atlantic Highlands, N.J., a corporation of New Jersey
Filed Nov. 8, 1963, Ser. No. 322,312
10 Claims. (Cl. 123—119)

This invention relates to improvements in internal combustion engines and valves and accessories used in connection therewith and as parts thereof.

An object of the invention is to provide a novel and improved internal combustion engine and the like, in which there is means for increasing the efficiency of fuel combustion by conducting partly unburned fuel and fuel mixtures back into the fuel intake or carburetor and thence into the cylinders for use.

Another object of the invention is to provide a novel and improved internal combustion engine in which there is conduit means connected between the crankcase and the carburetor of the engine for bleeding off from the crankcase such gaseous or vaporous fuel mixtures as may not have been completely subjected to combustion in the engine cylinders, and to conduct such bled off fuel mixtures or gases back to the carburetor for re-entry into the cylinders for further combustion thereof, whereby the said fuel mixtures or gases are substantially or wholly burned, thereby obtaining optimum fuel combustion efficiency, and minimizing and/or eliminating the presence in the exhaust gases from the exhaust output or muffler of the engine or tail pipe or unburned gases, thus avoiding discharge into the atmosphere of noxious or harmful or unburned gases or fuel mixtures.

A further object of the invention is to provide a novel and improved internal combustion engine in which there is a conduit means connected between the crankcase and the carburetor of the engine, with valve means interposed in said conduit means, the valve means being so constructed and arranged as to bleed off gases and vapors from the crankcase for recirculation into the cylinders of the engine through the carburetor, and with means in said valve means for regulating the direction of flow therethrough and the quantity of flow, whereby, in the event of a backfire or explosion in the carburetor or fuel conduits, said backfire is blocked from flowing backwards through said bypass conduit means and valve means to the crankcase, by the self closing action of the valve means construction.

Another object of the invention is to provide a novel and improved means for providing interconnection between the crankcase of an internal combustion engine and the carburetor or other ducts leading to the intake manifold to the cylinders, whereby partially burned gases and vapors in the crankcase may be refed to the intake to the cylinders for further combustion therein, so that complete combustion efficiency may be attained substantially, said means including ducts communicating between the crankcase and the carburetor intake, and valve means for regulating and controlling the flow of bled gases and vapors from the crankcase.

A further object of the invention is to provide a novel and improved valve means for interposition between the crankcase and carburetor or intake of an internal combustion engine for regulating the bleed rate of flow of gases and vapors from the crankcase to the carburetor, the valve means being normally closed and opening only upon production of vacuum in the carburetor and intake manifold leading to the cylinders of the engine, for drawing thereby unburned or partially burned gases and vapors from the crankcase into the carburetor for further combustion thereof, whereby the efficiency of the cycle of the engine is enhanced, said valve means being of improved construction.

Still another object of the invention is to provide a novel and improved valve means of the type described, in which the walls and moving parts are formed of material which is of a low resistance coefficient, so that, without reliance on added lubrication, friction is reduced to a minimum or avoided.

Still a further object of the invention is to provide a novel and improved by-pass valve device for bleeding off from the crankcase or other parts of an internal combustion engine, any unburned or partially burned gases and vapor mixtures of fuel and air and for conducting them back to the intake of the carburetor for admixture with the fuel-air inflow thereto to increase the efficiency of energy withdrawal by the engine from the fuel, and to also thereby complete the combustion to such an extent as to minimize or avoid the existence in the ultimate exhaust from the engine to atmosphere, of harmful gases and vapors.

Still another object of the invention is to provide a novel and improved valve device in which the parts are formed at least in part of material which not only is characterized by having a very low coefficient of friction, but also by having a high resistance to allowing deposition on its surface of soot and other carbonaceous materials, thereby preventing fouling of its surface and impairment of the working efficacy of its moving parts.

These and other objects and advantages of the invention will become apparent from the following description of a preferred embodiment of the invention, as illustrated in the accompanying drawings forming a part hereof, and in which, FIGURE 1 is a side elevational view of a valve device according to the invention, with inlet and outlet ducts shown in fragment.

FIGURE 2 is a right end elevational view of the valve device shown in FIGURE 1.

FIGURE 3 is a sectional elevational view of the device shown in FIGURE 1, as seen substantially on plane 3—3 of FIGURE 2.

FIGURE 4 is a sectional elevational view taken substantially on plane 4—4 of FIGURE 3.

FIGURE 5 is a sectional elevational view taken substantially on plane 5—5 of FIGURE 3.

FIGURE 6 is a transverse sectional elevational view taken substantially on plane 6—6 of FIGURE 3.

FIGURE 7 is a transverse sectional elevation taken on plane 7—7 of FIGURE 3.

FIGURE 8 is a schematic diagrammatic view showing the device in position on the engine. The engine is indicated only schematically and in fragment.

FIGURE 9 is a side elevational view showing a modified form of valve device according to the invention.

In connection with the operation of internal combustion engines, especially for propulsion of motor vehicles, it has been found that incomplete combustion of the air-fuel mixture which is fed into the engine through the intake manifold from the carburetor, results in presence in the exhaust gases of unwanted and noxious and harmful gas and vapor products. As a result, it is a purpose of the present invention to provide means whereby such products may be returned to the intake manifold of the engine for a further try at burning them, to extract their inherent fuel and energy content, and also to thereby block exit from the vehicle, of noxious, harmful and irritating gases, vapors and substances.

For example, it has been also found that due to leakage past the piston rings, between the pistons and the cylinders in which they reciprocate, unburned gases and air-fuel mixtures flow into the crankcase of the engine, being left therein for some time, and flowing out into the atmosphere through the crankcase breather pipe or otherwise leak out. As this is a waste of fuel the present device seeks to recover such unburned fuel-air components and feed them back into the carburetor intake and thus to enhance the efficiency of the engine. Further this device, by aiding in blocking discharge of carbon monoxide and other partially burned fuel elements into the atmosphere, aids in preventing irritations in the air and in production of "smog" due to motor vehicle operation.

In this device means is provided for interconnecting the crankcase with the carburetor intake or other similar part of the engine, by means of ducts, or one duct, and a novel type of valve device is interposed in the connecting duct, so that it is normally closed when the engine pistons are not moving, and the valve opens upon application of suction in the intake manifold, to allow a suction from the crankcase of a regulated flow of gases and fuel-air mixtures which are in the crankcase, to the carburetor, so that they may be further subjected to ignition in the cylinders and ultimately completely burnd. This increases the efficiency of the engine, and has other advantages mentioned herein. The valve device, which is normally closed, has a movable valve plunger, which allows passage through the valve only at the desired times in the engine cycle. The valve device is specially constructed to minimize or eliminate entirely, frictional drag and soot deposit, due to the unique properties of the valve which resist soot deposit, and thereby avoid possible fouling thereof. While friction cannot be entirely eliminated, it is considerably minimized.

The device may be installed on a motor vehicle at low cost, and without substantial structural or mechanical alteration of the engine itself. In addition, means may be used in connection with the valve device, for introducing ozone ($O_3$) into the bled-off-mixture of gases and vapors from the crankcase, for enhancing the combustibility thereof when returned to the carburetor intake ducts.

In order to understand clearly the nature of the invention, and the best means for carrying it out, reference may be had to the drawings, in which like numerals denote similar parts throughout the several views.

As shown in the drawings, there is a valve body 10 which may be formed of any suitable lightweight metal or plastic material, and may have flattened hexagonal or other suitable outer surfaces 12, to facilitate using a wrench thereon for installation purposes without slippage. As seen, the valve device body has first and second end portions 14 and 16, and may be suitably rounded off somewhat as seen at 18 and 20 to improve its outer contour and avoid sharp edges at the ends.

Referring to FIGURE 3, there is a carburetor delivery pipe 22 which is threaded at 24 into the right hand end 26 of the valve device body, the pipe being connectable from the valve device body to the carburetor air intake or other portion of the engine communicating with the cylinders thereof. As seen best in FIGURES 3, 4 and 5, the valve device body has a chamber 28 formed therein, which may be coaxial with the threaded bore 30, but is somewhat enlarged in diameter thereover. A plug member 32 may be force-pressed or otherwise seated in the left end portion of the chamber 28 as seen in FIGURE 3, to close the left end portion, and may be internally threaded on its bore 34 to receive in threaded engagement, the delivery pipe 36 which is connectable from the chamber 28 to the crankcase of the engine for delivery from the crankcase of unburned or otherwise unconsumed gases and air-fuel mixtures and vapors for a further try at their combustion in the cylinders, which is in effect a recycling of such fuel elements again.

Inside the chamber 28 is a liner member 38 which may be preferably cylindrical in contour and of an outside diameter equal to the inside diameter of the chamber 28, so as to fit snugly therein. A first end wall member 39 is disposed in the chamber 28 to the left of the liner member 38 as seen in FIGURE 3, and is preferably annular in contour with its outside diameter equal to the inside diameter of the chamber 28. As seen also in FIGURE 3, the end wall member 39 has a boss or projection 42 formed on its right face and projecting into the interior cylinder chamber 44 of the cylinder member 38. At the right end of the cylinder chamber 44, there is a second end wall member 46 which is seated into the chamber 28 and is preferably of equal outside diameter to that of chamber 28. It is thus apparent from FIGURES 3, 4, 5 and 6 that the interior of chamber 28 is lined at both ends and also in its cylindrical surface, by the members 39, 38 and 46.

A valve plunger member generally indicated at 50 is movably disposed in the cylindrical interior chamber 44, and is provided with a base or end wall portion 52 which is circular in contour and of sufficient axial depth to fit smoothly and longitudinally slidably against the interior surface of chamber 44. The member 50 also has shaft portion 54 which is preferably integral with the base member 52 and extends toward the end wall member 46 as seen in FIGURE 3. The right end portion 56 of the shaft portion 54 is tapered or frustoconical to form a valve plunger tip portion and there is a correspondingly shaped valve seat portion 58 formed in the end wall disc member 46 and through the member 46, to receive the valve plunger tip portion when the tip portion is moved to its rightmost position in FIGURE 3 into seating engagement with the valve seat 58, FIGURE 3 showing the valve plunger in retracted position. A spring 60 encircles the valve plunger stem 50 and bears against the base member portion 52 so as to bias it leftwardly as seen in FIGURE 3, to bring the base portion 52 against the boss portion 42 of wall 39, so as to close the bore 62 thereof when the plunger member is in its leftmost position as shown in the view.

In order to afford communication past the circular base portion 39 of the valve plunger, openings or scallops 64 are cut or formed into the perimeter of the base portion 39, so that gases can flow therethrough. Further, it is seen that the communication between the tube 36 and the tube 22 is also assured by formed openings 66 radially formed in the valve stem 50 which in turn all communicate with the axial bore or duct portion 68 in the right end of the valve stem 50. Thus, even when the valve stem 50 is in its rightmost seated position, there is still some communication between tube 36 and tube 22. However, when the conditions in the engine are such that the valve stem or plunger 50 is in its left-most position as shown in FIGURE 3, then communication between tubes 36 and 22 is blocked.

In order to minimize or almost substantially eliminate mechanical friction in the parts thus described, it is preferred that resort to lubrication by liquid or semi-liquid lubricants be avoided as much as possible, according to a preferred form. Accordingly, it is preferred, according to this preferred form of the invention, that the parts such as the cylinder 38 and the movable valve plunger 50 be made of materials which will not need such conventional types of lubrication. For this purpose, a plastic material may be used, such as "Teflon," which is a trade name for a form of polytetrafluoroethylene, namely a plastic tetrafluoroethylene homopolymer, which is a composition composed of very long chains of linked $CF_2$ units prepared by polymerization of tetrafluorethylene. This is set forth in detail in U.S. Patent 2,230,654 to Plunkett, Patent 2,394,243 to Joyce, Patent 2,393,967; to Renfrew Patent 2,534,058. This material, when used to form the parts 38 and 50, will result in a minimization or substantial elimination of friction, and may also be employed in forming the end wall elements 39 and 46, so that the enclosure in which the reciprocatable valve plunger 50 operates is formed of this material.

The material "Teflon" is identifiable by the following structural formula:

as well as by perusal or reference to the above patents, which are incorporated herein by reference thereto. This material is reputed to be not wettable by water, and as a material which does not stick to anything.

Accordingly, with its low friction and resistance to being coated with anything, such for example as soot, carbon and the like, it renders the valve device disclosed herein substantially unlikely to become clogged with soot deposits and hence makes it substantially trouble free and of long life in use.

As seen in FIGURE 8, the valve device 10 is readily attached to an automobile engine in order to connect the valve device intermediate the crankcase 70 of the engine, to bleed off the vapors and gases therefrom and conduct them to the carburetor or intake manifold, the carburetor being indicated generally at 72. An oil separator 74 may be interposed also in the duct 76 between the crankcase 70 and the valve device 10, in order to trap oil which might possibly flow from the crankcase, but such oil trap is not needed in the late model cars which have baffles in the outlet of the crankcase to block such oil outflow. As shown in FIGURE 8, the gases and vapors from the crankcase are bled off through pipes 76, 36 and 22, through the valve device 10, and thence flow into the carburetor air intake or into the intake manifold of the engine, so as to mix with the inflow to the cylinders, of the air-fuel mixtures from carburetor. As shown, air enters the carburetor 72 through the air cleaner 78, this being a "down-draft" type of carburetor, and is mixed with the inflowing gasoline in the venturi-throat of the carburetor to provide a suitable ignitable air-fuel mixture to be fed to the engine cylinders. The bled-off vapors from the crankcase are also fed into the air-fuel mixture flow for further combustion in the engine as explained above.

When the suction is provided by suction movement of the piston of the engine, on duct 22, the result is to move the valve plunger 50 to the right as seen in FIGURE 3, seating it on the valve seat 58, and unblocking its left head end 52 from duct 36, allowing gases and vapors to be drawn from the crankcase through duct 36, past scallops 64, through openings 66 and 68 in the valve plunger, and through the duct 22 to the carburetor. As seen in FIGURE 8, the pipes 76 and 36 may be directly interconnected, or through a valve 80 which may be interposed to block direct interconnection therebetween as explained further herein. When it is considered desirable to further enrich the bled-off gases and vapors from the crankcase by addition of oxygen, as in the form of ozone ($O_3$), this may be done by use of an ozone generator or ozonator device 82, into which ambient air is drawn from the atmosphere, and, by subjecting it to the influence well known, of high voltage from a suitable source, ozone is produced in the housing 82. By adjustment of the valve 80, the gases and vapors from the crankcase are caused to flow through pipe 76, and the ozonator 82, picking up ozone for admixture therewith and thence through pipe 36, the valve device 10, and pipe 22, to the carburetor. The bleed bore 68 in the valve stem 50 is carefully formed, so as to regulate the flow of bled-off gases and vapors as desired in accord with the needs of the engine. When the engine is not operating, the valve plunger 50 occupies the position shown in FIGURE 3, closing communication between the carburetor and the crankcase, due to the spring 60.

In the event of a misfire resulting in an explosion in the carburetor or intake manifold, the resulting pressure will move the valve stem 50 to the left as seen in FIGURE 3, blocking communication with the crankcase. For further adjustment of the valve action of device 10, there is a modified form as described further below, and as seen in FIGURES 8 and 9.

Referring to FIGURE 9, there is shown a modified form of valve device in which provision is also made for actual outside adjustment of the rate of flow from the crankcase to the carburetor or intake manifold. Thus there is a valve device body 86, with an inlet pipe or duct 88 for connection to the crankcase of the engine to draw incompletely burned vapors and gases therefrom and ultimately for delivery to the carburetor 72. The valve body has an extension portion 90 with a bore 92 formed therethrough, the end 94 of the delivery pipe 88 extending into communication with the bore 92 through extension portion 90. Thus the delivery pipe 88 of FIGURE 9 corresponds with pipe 36 of FIGURE 3. Also, there is a pipe 96 extending out of the valve body or housing 86 and it corresponds to pipe 22 of FIGURE 3, being intended to connect with the carburetor or intake manifold of the engine. The interior construction of the valve 86 is the same as that shown in FIGURE 3, that is to say that it has the liners like 38, walls like 39 and 46, and valve plunger like 50; however for variation of illustration the view of FIGURE 9 is turned 180 degrees from that of FIGURE 3. In order to allow for influx of ozone ($O_3$) from an ozone generator like 82, the valve device 86 has an ozone delivery pipe 98 threaded into the bore 92 and it is connectable at its outer or rightmost end as seen in the view, to the ozone generator by a flexible pipe, not shown. It is seen that by turning the threaded nipple 98 about its axis, it is movable axially in either direction as shown by arrow 100, and consequently its inner end 102 may be adjusted in position so as to overlie or cover up more or less of the inner portion of pipe 94 and 88, so as to regulate easily the amount of opening from pipe 88, and hence to allow the rate of gas flow from the crankcase to be regulated by merely turning the nipple 98. In order to maintain any desired adjustment, a locknut 104 is threaded onto nipple 98 and may be tightened against the right end of the extension 90, or loosened easily as needed. It is thus apparent from FIGURE 9, that gases from the crankcase 70 are drawn in through pipe 88, their rate of flow being regulated by adjustment of hollow nipple 98, the nipple 98 also serving to deliver ozone from the ozone generator where used, and it may be closed with a cap or clamp when the ozone generator is not employed. The gases flow out through pipe 96 to the carburetor as explained.

The valve device of FIGURES 3 or 9 may be placed in any convenient disposition, and even mounted on or inside the ozone generator box 82, avoiding engine heat as much as possible, and heating of the valve device from the engine directly, thus further minimizing caking and soot deposits. The ozone generator 82 is provided with an air intake pipe or opening, not shown, and this may have a fibrous filter to filter out dust from the air. Experience has shown that in use of the valve devices and other equipment shown and described, not only is production of unwanted carbon monoxide and other gases and vapors reduced considerably, but also the efficiency of the fuel consumption cycle of the engine is increased, so that the mileage per gallon of gasoline increases.

While a preferred embodiment of the invention is shown and described in detail, it is understood that various changes may be made in size, shape, materials and arrangement without departing from the spirit and scope of the invention as claimed.

I claim:
1. A valve device comprising a main housing having a chamber formed therein, a first end wall in said chamber and formed with an opening defining a first end wall valve seat, first duct means connecting with said chamber through said first end wall valve seat and connectable to the crankcase of an engine, a second end wall in said chamber and spaced from said first end wall at the opposite end of said chamber, second duct means connecting with said chamber through said second end wall and connectable to the carburetor and intake manifold of said engine for conducting gases and vapors from said crankcase to said intake manifold for combustion in said engine, second valve seat means formed in said second end wall, side liner wall means in said chamber so that said chamber is lined with said first and second end walls and the interconnecting side liner wall means aforesaid, and valve plunger means movably disposed in said chamber and slidably engaging said side liner wall means, said valve plunger means being constructed and arranged for movement from a first position at which it blocks communication between said first duct means and said chamber when said engine is not operating, to a second operated position in seating engagement with said second valve seat means and out of contact with seating engagement with said first valve seat means, for providing limited restricted communication between said first and second duct means for gas and vapor flow therebetween to said carburetor.

2. The construction according to claim 1, wherein said valve plunger means and said side liner wall means are formed of a plastic material consisting of "Teflon."

3. The construction according to claim 1, wherein said valve plunger means, said side liner wall means, and said first and second end walls are formed of a plastic material consisting of "Teflon."

4. The construction according to claim 1, wherein said valve plunger means comprises a plunger body, a plunger head portion carried at the end of said plunger body nearest said first valve seat for normally overlying the same to block the same, spring means biasing said valve plunger means into said blocking engagement with said first valve seat, a valve body extension portion carried at the opposite end portion of said plunger body and constructed and arranged for seating engagement with said second valve seat means when said engine is running, said plunger body extension portion having bleeder conduits formed therein for passage from said chamber and through into said second duct means of gases and vapors flowing from the crankcase into said chamber, said plunger head portion having openings formed therethrough for entry of gases and vapors therepast into said chamber upon the unseating of said valve plunger head portion from closing said first valve seat.

5. A valve device according to claim 1, wherein said device comprises a valve extension portion carried by said valve main housing at the end thereof opposite to said first end wall, and having a bore formed therethrough, a nipple threaded into said bore and extending outwardly therefrom for connection to a source of ozone, locknut means threaded to said nipple for maintaining adjustment positions of engagement thereof with said valve extension portion, said second duct means being connected so as to open upon said threaded bore, whereby by adjustment of the degree of overlapping of said inner end of said second duct means by said threaded nipple, the amount of bleeding of gases and vapors from the said engine crankcase is adjustable externally of the valve device, by loosening of said locknut means and adjustment of the position of the said threaded nipple for greater or less overlap of the inner end of said first duct means leading from said crankcase.

6. The construction according to claim 4, wherein said bleeder conduits in said valve body extension are formed of an axial bore of limited diameter extending through said valve body extension and a plurality of bleeder feeder ducts radiating from said axial bore at a portion thereof within said chamber, whereby, upon seating against said second seat, said gases are free to flow through said feeder ducts and the seated valve portion into said duct leading to said carburetor.

7. A valve device comprising a valve body having a chamber formed therein, first duct means connected to said chamber and adapted for connection to the crankcase of an engine, second duct means connected to said chamber and adapted for connection to the carburetor air intake means of said engine, valve plunger means disposed in said chamber and constructed and arranged for normally blocking communication between said crankcase and said chamber in the absence of production of a vacuum in the said carburetor air intake means, and constructed and arranged for opening to afford restricted communication between said first and second duct means upon operation of the engine to produce said vacuum, whereby gases and vapors from the crankcase are drawn into the carburetor for combustion in the engine cylinders, means cooperating with said valve device for producing ozone, and valve and duct means constructed and arranged for introducing said ozone into the said valve device body for enriching the inflammability of said gases and vapors being conducted from the crankcase.

8. A valve device comprising a valve body having a chamber formed therein, first duct means connected to said chamber and adapted for connection to the crankcase of an engine, second duct means connected to said chamber and adapted for connection to the carburetor air intake means of said engine, valve plunger means disposed in said chamber and constructed and arranged for normally blocking communication between said crankcase and said chamber in the absence of production of a vacuum in the said carburetor air intake means, and constructed and arranged for opening to afford restricted communication between said first and second duct means upon operation of the engine to produce said vacuum, whereby gases and vapors from the crankcase are drawn into the carburetor for combustion in the engine cylinders, and wherein said valve plunger means and said chamber walls are formed of a material consisting of a plastic tetrafluoroethylene homopolymer which is a composition composed of very long chains of linked $CF_2$ units prepared by polymerization of tetrafluorethylene.

9. A valve device comprising a valve body having a chamber formed therein, first duct means connected to said chamber and adapted for connection to the crankcase of an engine, for conducting gases and vapors from said crankcase into said chamber, second duct means connected to said chamber and adapted for connection to the carburetor and intake manifold of said engine for conducting said gases and vapors from said chamber into said intake manifold and carburetor for combustion in said engine, valve plunger means disposed in said chamber and constructed and arranged for normally blocking communication between said first and second duct means through said chamber in the absence of production of a vacuum in a cylinder of said engine, and for movement to an operating position affording restricted communication between said first and second duct means upon operation of the engine to produce a vacuum in the intake manifold, whereby said crankcase gases and vapors from said crankcase are bled off and conducted to the engine cylinders for combustion therein, and wherein said valve plunger means and walls of said chamber in which said valve plunger means is movable are formed of a material consisting of "Teflon."

10. A valve device comprising a valve body having a chamber formed therein, first duct means connected to said chamber and adapted for connection to the crankcase of an engine, for conducting gases and vapors from said crankcase into said chamber, second duct means connected to said chamber and adapted for connection to the carburetor and intake manifold of said engine for conducting said gases and vapors from said chamber into said intake manifold and carburetor for combustion in said engine, valve plunger means disposed in said chamber and constructed and arranged for normally blocking communication between said first and second duct means through said chamber in the absence of production of a vacuum in a cylinder of said engine, and for movement to an operating position affording restricted communication between said first and second duct means upon operation of the engine to produce a vacuum in the intake manifold, whereby said crankcase gases and vapors from said crankcase are bled off and conducted to the engine cylinders for combustion therein, and wherein said valve plunger means is formed of a material consisting of "Teflon."

References Cited by the Examiner

UNITED STATES PATENTS

| | | | |
|---|---|---|---|
| 1,459,306 | 6/1923 | Kodama | 123—119 |
| 2,281,124 | 4/1942 | Westcott | 123—119 |
| 2,676,613 | 4/1954 | Baxter | 137—516.25 |
| 3,088,447 | 5/1963 | Henderson | 123—119 |
| 3,122,162 | 2/1964 | Sands | 137—516.25 |

KARL J. ALBRECHT, *Primary Examiner.*

RICHARD B. WILKINSON, *Examiner.*